Nov. 2, 1965  W. D. BEHLEN  3,215,118
ANIMAL PEN CONSTRUCTION
Filed June 14, 1963
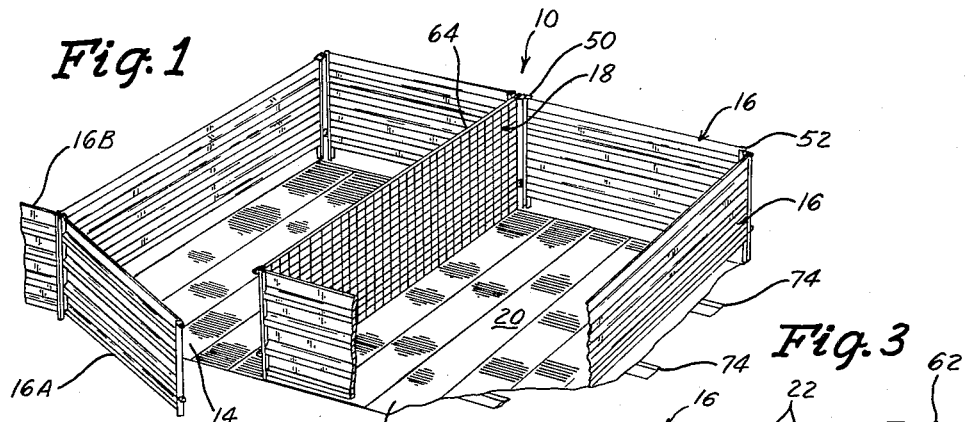
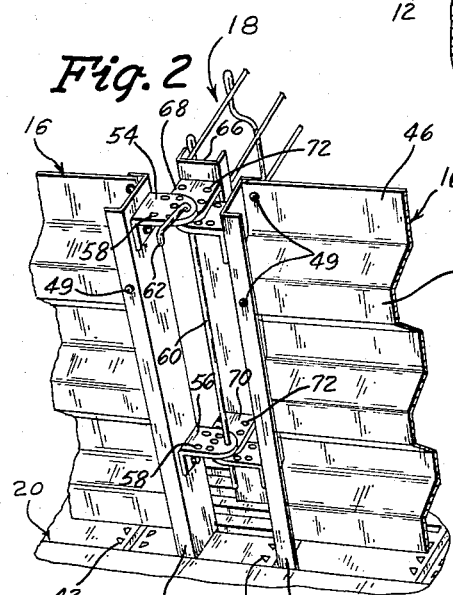
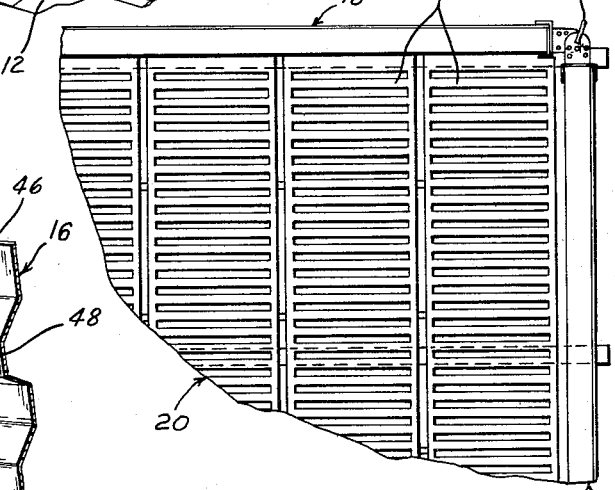
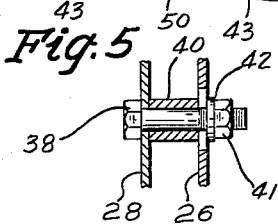
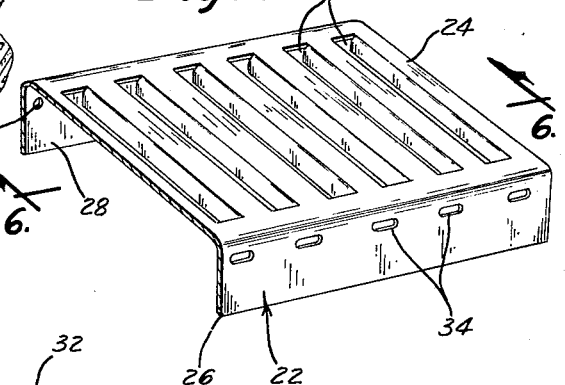
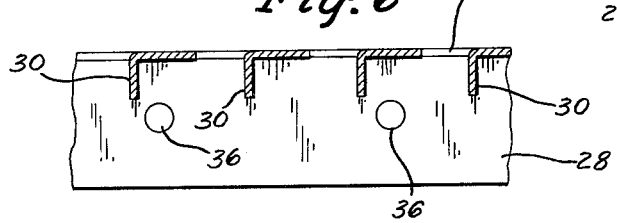
INVENTOR
WALTER D. BEHLEN
BY
Dick, Zarley + Henderson
ATTORNEYS United States Patent Office 3,215,118
Patented Nov. 2, 1965

3,215,118
ANIMAL PEN CONSTRUCTION
Walter D. Behlen, Columbus, Nebr., assignor to Behlen Manufacturing Company, Inc., Columbus, Nebr., a corporation of Nebraska
Filed June 14, 1963, Ser. No. 287,823
4 Claims. (Cl. 119—20)

This invention relates to an animal pen construction and in particular to a portable pen that is easily assembled into an infinite number of different enclosures.

Heretofore portable animal pens, pig pens in particular, have been constructed of wood materials nailed together with nails which were hard to remove. If the nails were only partially driven in, they would pull out in a short time by pressure from the animals.

Another problem with the wooden constructed pens was in the flooring. It usually was made solid by boards positioned in contiguous relationship to provide the necessary strength required of the floor. Consequently droppings from the animals and used bedding would accumulate which periodically had to be removed. The cleaning up of the pens of necessity was done manually requiring much time and expense.

Therefore, it is an object of this invention to provide an animal pen construction having wall sections which may be easily assembled and disassembled.

Another object of this invention is to provide wall sections for use in animal pen constructions which may be combined in different arrangements to give the desired floor plan.

Another object of this invention is to provide an animal pen construction having wall sections which may serve as gates if desired.

Another object of this invention is to provide an animal pen having wall sections with adjustable connecting elements to compensate for minor variances in the effective length of different wall sections.

Another object of this invention is to provide an animal pen construction having flooring comprised of sections which are easily assembled to accommodate a given enclosure.

Another object of this invention is to provide an animal pen construction having slots formed in the flooring with no resultant sacrifice of structural strength.

Another object of this invention is to provide an animal pen construction which is portable.

Another object of this invention is to provide an animal pen construction being simple in design, economical to manufacture, and durable in use.

These and other objects, and other features and advantages of this invention will become readily apparent upon reference to the following description when taken in conjunction with the accompanying drawings, wherein:

FIG. 1 is a perspective view of one possible arrangement of the parts of this invention with portions of the wall sections and flooring broken away to more clearly illustrate the invention's construction;

FIG. 2 is a fragmentary perspective view of the pen construction illustrating the ends of three wall sections releasably coupled together;

FIG. 3 is a fragmentary top plan view of the animal pen construction illustrating in particular one arrangement of the flooring sections and a corner connection between two wall sections;

FIG. 4 is a fragmentary perspective view of one channel section from the flooring of the animal pen construction;

FIG. 5 is a fragmentary side view of the connecting means provided between adjacent channel flooring sections; and FIG. 6 is a cross-sectional view of the channel section of the flooring taken along line 6—6 in FIG. 4.

The animal pen construction of this invention is referred to generally in FIG. 1 by the reference numeral 10. It comprises enclosed pens 12 and 14 formed by outside wall sections 16 and 16A and a divider section 18. Extending beneath these sections is the heavy gauge sheet metal flooring 20.

The flooring 20 as shown in FIGS. 1 and 3 and in detail in FIG. 4 comprises a plurality of elongated inverted channel sections 22 juxtapositioned. These sections should be of a uniform width and length. The length will ordinarily correspond to the length of the parallel side wall sections 16.

Each channel section 22 has a base 24 and leg flanges 26 and 28. Uniformly spaced transverse portions 30 are bent out of the plane of the channel base 24 to extend downwardly between legs 26 and 28 (FIG. 6). Bending of portions 30 out of the channel base provides uniformly spaced elongated slots 32 which measure in length and width the same as the portions 30.

The channel legs 26 adjacent the base 24 are provided with spaced slots 34 while in the same plane in the legs 28 are formed holes 36.

In assembly of the flooring 20 the channel sections 22 extend in the same direction such that a slot 34 in leg 26 will align with a hole 36 in a leg 28. As shown in FIG. 5, a bolt 38 is positioned in these openings and carries a bushing 40 for separating each pair of channels 22. A nut 41 and washer 42 are provided on the free end of the bolt 38 and overlap the slot 34. By use of the slots 34 in lieu of holes, the channels 22 may be slightly out of longitudinal alignment and still have sufficient space in the slots in alignment with holes 36 to receive the bolts 38.

At the end of the margins in the base 24 between the slots 32 and the legs 26 and 28 are provided triangluar openings 43 for securing the wall sections 16 to the flooring 20 in a manner to be later described.

The outer wall sections 16 are formed of corrugated sheet metal (FIG. 2) having alternate portions 46 and 48 horizontally disposed in opposite directions and riveted at their ends to the flanges of oppositely facing vertical channel members 50 and 52. The outer face of the base of the channel members 50 and 52 are provided with L-shaped tabs 54 and 56 in vertical spaced relationship. Each of the tabs 54 and 56 is provided with a plurality of holes 58. When one of the holes in each of two tabs 54 are aligned at the top of two wall sections and one of the holes in each of the bottom tabs 56 are in alignment, a locking element 60 may be extended therethrough to pivotally connect the two wall sections. As many as four sections may be joined by one locking element 60. The locking element 60 is provided with a handle 62 to facilitate its insertion through and withdrawal from the holes 58 in the tabs 54–56.

As shown in FIG. 2, alternate sections (Section 52) 16 are restrained from horizontal movement by means connected to the bottom end of channel members 50 and 52 and extending into the triangular openings 43 in the adjacent flooring channel sections 22.

As shown in FIGS. 1 and 2, a divider section 18 is provided between two end wall sections 16 thereby dividing the larger pen construction 10 into the two smaller enclosures 12 and 14. The divider section 18 is formed in the shape of the corrugated wall sections 16 but is made into a matrix from stiff wire or rod 64 and provided at each of its ends with channel members 66. Similar to the sections 16, L-shaped tabs 68 and 70 are attached to the outside face of the channel member 66. One of a plurality of holes 72 in each of the tabs 68 and 70 is shown in FIG. 2 as being in alignment with a corresponding hole 58 in each of tabs 54 and 56 on each of the two sections 16.

By the provision of runners 74 under the flooring 20 (FIGS. 1 and 3) the animal pen construction is made completely portable.

Innumerable uses may be made of the wall sections 16 in conjunction with the flooring channel sections 22. As shown in FIG. 1, six sections 16 have been coupled together to form the outside enclosure and with a divider 18 down the center two animal pens have been made available. Section 16A is shown pivoted partially opened in FIG. 1 and thus serving as a gate. Extending from its pivotal point is another section 16B which could be one section of another enclosure.

Greater horizontal stabilization for the wall sections 16 may be obtained by use of longer bushings 40 as necessary to provide for alignment of the securing means in each of the channels 50 and 52 with a triangular opening 43. Ordinarily, one point of securement to the flooring 20 at each joint is sufficient to maintain the desired rigidity in the enclosure wall.

Another use among many for the sections 16 is in cooperation with two walls of a building which meet in a corner. The two sections 16 coupled together at one end as shown in FIG. 2 and secured to the respective walls of the building at their other ends will provide a very useful temporary enclosure. Moreover, one of the sections could serve as a gate member for access to the enclosure.

Connections between two or more sections 16 or dividers 18 is made easy since a choice from six holes in each tab is available for alignment with any one hole in the other adjacent tabs.

The flooring 20 comprised of the plurality of slotted channel sections 22 is self cleaning. As animal droppings and the like fall onto the flooring they eventually fall through one of the slots 32 onto the ground. Structural strength is not lost by the openings 32 since the material cut out is retained in the form of transverse portions 30.

Some changes may be made in the construction and arrangement of my animal pen construction without departing from the real spirit and purpose of my invention, and it is my intention to cover by my claims, any modified forms of structure or use of mechanical equivalents which may be reasonably included within their scope.

I claim:

1. In a self cleaning animal pen floor construction, comprising,
    a plurality of elongated downwardly facing channel members arranged in side by side relationship with their longitudinal axes being parallel, each of said channel members having a base portion and a continuous flange portion extending the length thereof at each side,
    said base portion having a series of uniformly longitudinally spaced integral flange elements deformed out of said base portion and extending in parallel relation to each other transversely of said elongated channel,
    said continuous side flange having a plurality of longitudinally spaced part slots formed therein, said slots extending lengthwise of said channel.
    a plurality of bushings disposed between the continuous flange of one channel and the adjacent continuous flange of another channel with said slots in said adjacent continuous flanges being in alignment, and
    a detachable bolt means received in said aligned slots and bushings and tightened to maintain adjacent channels in spaced relation to each other and thereby defining an elongated passageway between the adjacent continuous flanges of adjacent channels.

2. The structure of claim 1 and sled runners being positioned under said plurality of channel members and extending transversely of each channel member, said continuous flange portions having their outer longitudinal edges in engagement with said sled runners.

3. A portable animal pen construction, comprising,
    at least three wall sections each disposed with one end adjacent one end of each of the other wall sections,
    a pair of vertically spaced tab elements extending horizontally and longitudinally outwardly of said one end of each wall section,
    each tab element having a plurality of holes formed therein, each tab element on each wall section being in vertical alignment, and
    a rod element extending through a selected hole of each tab of each wall section to detachably jack said wall sections together at their one end.

4. The structure of claim 3 wherein each of said wall sections has a vertically disposed channel member at each end thereof and said tab elements are connected thereto, said wall section including a panel between said vertical end channels and said panel includes vertically disposed portions alternately disposed adjacent opposite legs of said vertical channel and means for securing said vertical portions to said opposite legs and a portion extending diagonally between integrally interconnecting adjacent vertical panel portions.

References Cited by the Examiner

UNITED STATES PATENTS

| | | | |
|---|---|---|---|
| 492,777 | 3/93 | Buchanan | 119—28 |
| 512,509 | 1/94 | Hall | 256—14 |
| 1,006,796 | 10/11 | Rupp | 256—24 |
| 1,330,404 | 2/20 | Sommer | 119—20 |
| 1,764,584 | 6/30 | Tarrier | 256—25 |
| 2,217,083 | 10/40 | Vetter | 189—34 |
| 2,308,943 | 1/43 | Tietig et al. | 189—34 |
| 2,764,127 | 9/56 | Newmann | 119—20 |
| 2,907,417 | 10/59 | Doerr | 189—34 |
| 3,002,493 | 10/61 | Galamba | 119—20 |
| 3,082,739 | 3/63 | Schloemer | 119—20 |
| 3,105,462 | 10/63 | Miller | 119—20 |

SAMUEL KOREN, *Primary Examiner.*

ALDRICH F. MEDBERY, *Examiner.*